(12) United States Patent
Olvera-Hernandez et al.

(10) Patent No.: US 8,077,672 B2
(45) Date of Patent: Dec. 13, 2011

(54) METHOD AND APPARATUS FOR MEDIA INDEPENDENT HANDOVER CAPABILITY DISCOVERY

(75) Inventors: Ulises Olvera-Hernandez, Kirkland (CA); Khalid S. Hossain, Montreal (CA); Mahmoud Watfa, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 716 days.

(21) Appl. No.: 12/027,892

(22) Filed: Feb. 7, 2008

(65) Prior Publication Data

US 2008/0219215 A1 Sep. 11, 2008

Related U.S. Application Data

(60) Provisional application No. 60/888,789, filed on Feb. 8, 2007.

(51) Int. Cl.
*H04W 36/00* (2009.01)
(52) U.S. Cl. .................. 370/331; 455/436; 455/442
(58) Field of Classification Search .................. None
See application file for complete search history.

(56) References Cited

U.S. PATENT DOCUMENTS

| | | | |
|---|---|---|---|
| 7,313,628 B2 | 12/2007 | Chaskar et al. | |
| 7,483,984 B1 | 1/2009 | Jonker et al. | |
| 2002/0071404 A1* | 6/2002 | Park et al. | 370/331 |
| 2002/0141365 A1 | 10/2002 | Leung | |
| 2004/0202131 A1* | 10/2004 | An et al. | 370/331 |
| 2006/0056350 A1 | 3/2006 | Love et al. | |
| 2006/0258355 A1 | 11/2006 | Olvera-Hernandez et al. | |
| 2008/0176567 A1* | 7/2008 | Oba et al. | 455/436 |

FOREIGN PATENT DOCUMENTS

| | | |
|---|---|---|
| WO | 00/07401 | 2/2000 |
| WO | 04/045081 | 5/2004 |
| WO | 2006/052563 | 5/2006 |
| WO | 2006/099400 | 9/2006 |
| WO | 2006/123907 | 11/2006 |

(Continued)

OTHER PUBLICATIONS

LAN MAN Standards Committee of the IEEE Computer Society, "Draft IEEE Standard for Local and Metropolitan Area Networks: Media Independent Handover Services", IEEE P802.21™/D03.00, (Dec. 2006).

(Continued)

*Primary Examiner* — Robert Scheibel
(74) *Attorney, Agent, or Firm* — Volpe and Koenig, P.C.

(57) ABSTRACT

A first media independent handover function (MIHF) receives a media independent handover (MIH) capabilities discovery request from a second MIHF and generates a MIH capabilities discovery response message, including one or more parameters. Then the first MIHF then sends the MIH capabilities discovery response to the second MIHF. Based on the information contained in the MIH capabilities discovery response, the first MIHF may receive a handover request message from the second MIHF. The one or more parameters included within the discovery response message indicates the specific technologies for which the first MIHF supports a MMB handover. The one or more parameters may include a list of the technologies for which a make-before-break (MMB) handover is supported. For example, a parameter may use a specific bit structure wherein each bit is a Boolean representation of whether MMB handover is supported for a specific type of technology.

14 Claims, 2 Drawing Sheets

FOREIGN PATENT DOCUMENTS

WO    2006/132487    12/2006

OTHER PUBLICATIONS

LAN MAN Standards Committee of the IEEE Computer Society, "Draft IEEE Standard for Local and Metropolitan Area Networks: Media Independent Handover Services", IEEE P802.21™/D8.0, (Dec. 2007).

Joint Harmonized Contribution, "Media Independent Handover," IEEE 802.21 Media Independent Handover Services (May 2005).

Kim et al., "Proposed Modification of the MIH Capability Discovery," IEEE 802.21 Media Independent Handover Services (Sep. 13, 2005).

Olvera-Hernandez et al., "IEEE 802.21 Media Independent Handover Services; Enhancement to the MIH_Capability_Discovery Message," IEEE802.21-07/57r0 (Feb. 15, 2007).

\* cited by examiner

US 8,077,672 B2

METHOD AND APPARATUS FOR MEDIA INDEPENDENT HANDOVER CAPABILITY DISCOVERY

CROSS REFERENCE TO RELATED APPLICATIONS

This application claims the benefit of U.S. provisional application No. 60/888,789 filed on Feb. 8, 2007, which is incorporated by reference as if fully set forth.

BACKGROUND

The IEEE 802.21 standard includes mechanisms and procedures that aid in the execution and management of inter-system handovers. In particular, IEEE 802.21 defines a media independent handover (MIH) function (MIHF) which resides in communications entities of several wireless systems capable of supporting inter-system handover. For example, FIG. 1 shows an example of network architecture for wireless systems capable of supporting inter-system handover. These underlying technologies may include for example 3GPP, 3GPP2 and IEEE-based networks such as IEEE 802.xx, code division multiple access (CDMA) 2000; universal mobile telephone system (UMTS), GSM, long term evolution (LTE) or any other wireless communication system including future wireless communication systems not yet developed.

MIH functions can be implemented in any wireless communication system. The prior art has suggested enhancements regarding the use of several messages, including an MIH_Capability_Discover Request/Confirm message. Such enhancements include modifications to message parameters so that MIH capable nodes can discover the capabilities of other MIH enabled peers in an efficient manner.

The modifications to the message parameters enables a single MIH_Capability_Discover message to be used to discover all the important capabilities of a peer node, such as the number and type of supported links and the link events pertaining to specific link types as opposed to the previous method where one such message had to be sent for every link type that is supported at a remote end.

Although proposed structures may provide an efficient way of discovering link-related capabilities and the type of transport supported, such structures do not facilitate determination of other important the capabilities of these links. Accordingly, a vast improvement in the capability discovery is still greatly needed.

SUMMARY

A first MIHF receives a MIH capabilities discovery request from a second MIHF and generates a MIH capabilities discovery response message, including one or more parameters. Then the first MIHF then sends the MIH capabilities discovery response to the second MIHF. Based on the information contained in the MIH capabilities discovery response, the first MIHF may receive a handover request message from the second MIHF.

The one or more parameters included within the discovery response message indicates the specific technologies for which the first MIHF supports a make-before-break (MBB) handover. The one or more parameters may include a list of the technologies for which a MBB handover is supported. For example, a parameter may use a specific bit structure wherein each bit is a Boolean representation of whether MBB handover is supported for a specific type of technology.

DETAILED DESCRIPTION

When referred to hereafter, the terminology "wireless transmit/receive unit (WTRU)" includes but is not limited to a user equipment (UE), a mobile station (STA), a mobile node (MN), a fixed or mobile subscriber unit, a pager, a cellular telephone, a personal digital assistant (PDA), an MIH function, a computer, or any other type of user device capable of operating in a wireless environment. When referred to hereafter, the terminology "access point (AP)" includes but is not limited to a Node-B, a site controller, base station, a point of attachment (PoA), a point of service (PoS), an MIH function, or any other type of interfacing device capable of operating in a wireless environment.

Figure 2:
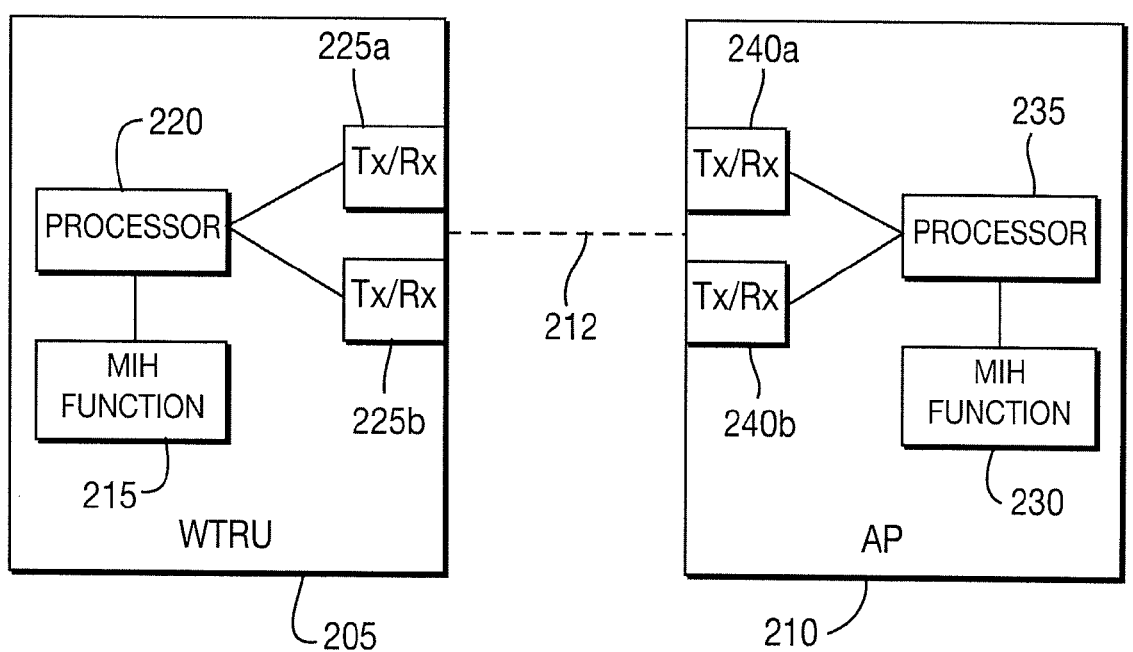
FIG. 2 is a block diagram of a typical wireless communication system.

FIG. 2 is a block diagram of a wireless communication system 200 including a wireless transmit receive unit 205 and an AP 1210. The WTRU 205 and the AP 210 communicate via a wireless communication link, 212.

As shown in FIG. 2, the WTRU 215 includes an MIHF 215, a processor 220, at least one transceiver (225a, 225b). The processor 220 is attached to the MIHF 215 and each of the transceivers 225a, 225b. The MIHF 215 is configured to carry out media independent handover related processes, including generating an MIH capabilities discovery request, and processing an MIH capabilities response.

Also shown in FIG. 2, the AP 210 includes an MIHF 230, a processor 235, at least one transceiver (240a, 240b). The processor 235 is attached to the MIH function 215 and each of the transceivers 225a, 225b. The MIHF 230 is configured to carry out media independent handover related processes, including processing an MIH capabilities discovery request, and generating an MIH capabilities response. Optionally, the MIHF 230 may be located outside of the AP 210 in the network (not shown). For example, the AP 210 may be connected to an access router (not shown) which may house the MIHF 230.

Figure 3:
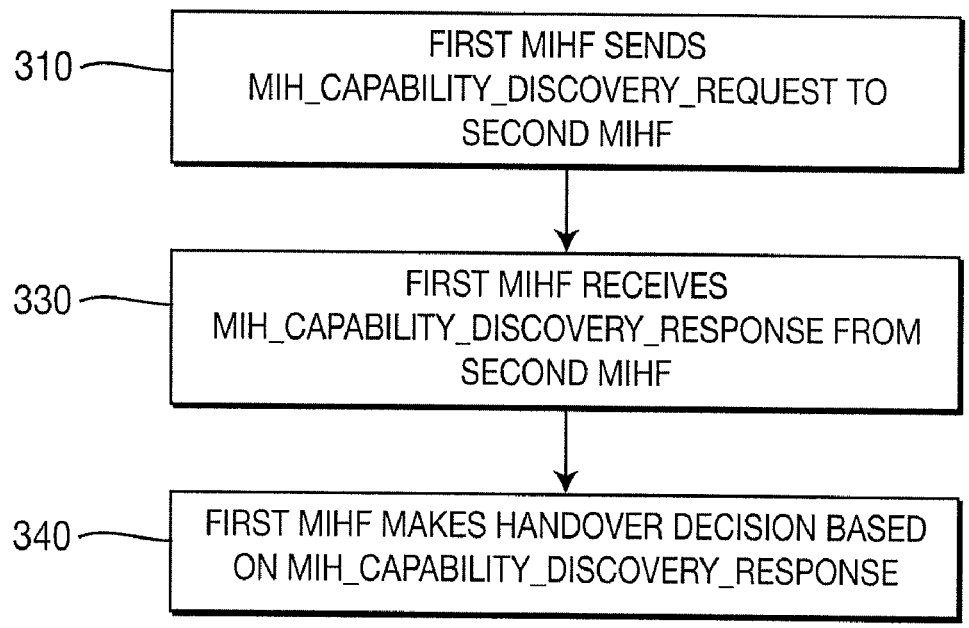
FIG. 3 is a flow chart of an method of discovering MIH capabilities.

FIG. 3 shows a flow diagram of a method 300 for receiving MIH capabilities. First, the first MIHF sends an MIH capabilities discovery request to a second MIHF, at 310. For the purposes of the method of 300, the first MIHF could be located in an the AP 210 as MIHF 230, or the first MIHF could be located in the WTRU 205 as MIHF 215. In a third alternative the MIHF could be located in the network (not shown). In response, the first MIHF receives an MIH capabilities discovery response from the second MIHF, at 320. Then the first MIHF makes a decision whether to handover to the second MIHF based on information contained in the MIH capabilities discovery response, at 340.

The MIH capabilities discovery response message includes at least a Linc parameter and an MBB handover support parameter MBBHandoverSupport. The Linc element will include a list of the network types supported by the MIHF. The MBBHandoverSupport parameter provides a list of the technologies for which an MMB handover is supported. For example, the MBBHandoverSupport parameter may use a specific bit structure wherein each bit is a Boolean representation of whether MBB handover is supported for a specific type of technology. It should also be noted, that it is assumed that all available links support break-before-make (BBM) handover by default, therefore there the information relating to BBM handover capabilities is not needed.

Table 1 shows an example of a possible bit structure for the MBBHandoverSupport parameter; however, one of skill in the art would recognize that many other structures are possible and Table 1 is in no way intended to limit the scope of the invention to the specific bit structure therein.

TABLE 1 example of possible bit structure for the proposed MBBHandoverSupport parameter

| Parameter | Description |
| --- | --- |
| MBBHandoverSupport | A bit field that has as many bits as there are potential supported lines. There should be as many entries for this field as there are possible supported links.<br>Bit #0-indicates if a MBB handover to 802.3 is supported<br>Bit #1-indicates if a MBB handover to 802.11 is supported<br>Bit #2-indicates if a MBB handover to 802.16 is supported<br>Bit #3-indicates if a MBB handover to CDMA2000 is supported<br>Bit #4-indicates if a MBB handover to UMTS is supported<br>Bit #5-indicates if a MBB handover to CDMA2000-HRPD is supported<br>Bit #6-indicates if a MBB handover to GSM is supported<br>Bit #7 to Bit #15-reserved for future use |

Optionally, the MIH discovery response message may also include a number of supported links parameter NumberOfSupportedLinks. This parameter would indicate the number of links that the communication entity associated with the MIHF supports. Table 2 shows an example of a definition for the NumberOfSupportedLinks parameter; however, one of skill in the art would recognize that many other structures are possible and Table 2 is in no way intended to limit the scope of the invention to the specific bit definition or bit structure therein.

TABLE 2 example of the proposed NumberOfSupportedLinks parameter.

| Parameter | Description |
| --- | --- |
| NumberOfSupportedLinks | An 8-bit unsigned integer that represents the number of supported links in an MIH capable node |

Figure 4:
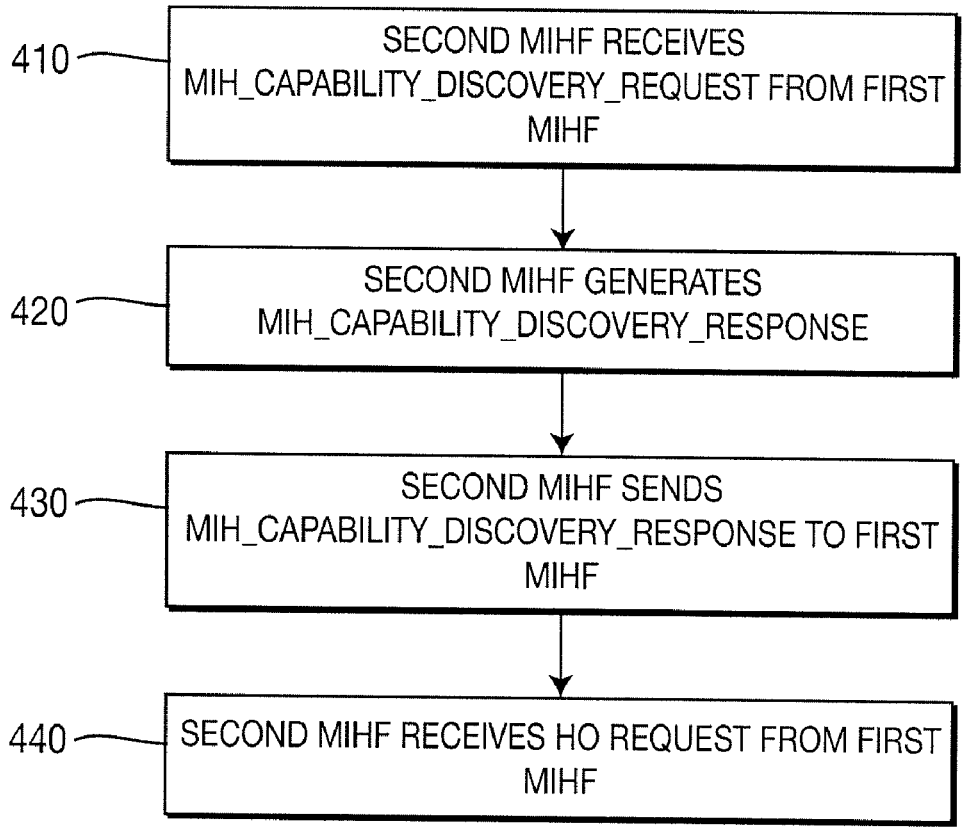
FIG. 4 is a flow chart of a method of providing MIH capabilities.

FIG. 4 shows a flow diagram of a method 400 for providing MIH capabilities to a first MIHF. For the purposes of the method of 400, the first MIHF could be located in an the AP 210 as MIHF 230, or the first MIHF could be located in the WTRU 205 as MIHF 215. In a third alternative the MIHF could be located in the network (not shown). First, the second MIHF receives an MIH capabilities discovery request from the first MIHF, at 410. Next, the second MIHF generates an MIH capabilities discovery response message, including an MBBHandoverSupport parameter indicating the specific technologies for which the second MIHF supports an MBB handover, at 420. Then the second MIHF sends the MIH capabilities discovery response to the first MIHF, at step 430. Optionally, the second MIHF may send the MIH capabilities discovery response via broadcast, multicast or unicast. Based on the information contained in the MIH capabilities discovery response, the second MIHF may receive a handover request message from the first MIHF, at 440.

In an alternative embodiment, it may not be assumed that all of the available links support BBM handover. In this situation, a third parameter may be included in the MIH capabilities discover message to indicate the availability of BBM handover for specific technologies (BBMHandoverSupport). Table 4 shows an example of a possible bit structure for the BBMHandoverSupport parameter; however, one of skill in the art would recognize that many other structures are possible and Table 1 is in no way intended to limit the scope of the invention to the specific bit structure therein.

TABLE 3

Example for the proposed BBMHandoverSupport parameter

| Parameter | Description |
| --- | --- |
| BBMHandoverSupport | A bit field that has as many bits as there are potential supported links. There should be as many entries for this field as there are possible supported links.<br>Bit #0-indicates if a BBM handover to 802.3 is supported<br>Bit #1-indicates if a BBM handover to 802.11 is supported<br>Bit #2-indicates if a BBM handover to 802.16 is supported<br>Bit #3-indicates if a BBM handover to CDMA2000 is supported<br>Bit #4-indicates if a BBM handover to UMTS is supported<br>Bit #5-indicates if a BBM handover to CDMA2000-HRPD is supported<br>Bit #6-indicates if a BBM handover to GSM is supported<br>Bit #7 to Bit #15-reserved for future use |

The procedures 300, 400, of FIGS. 3 and 4 the first and second MIHFs may be located in a WTRU 205, an AP 210, or some other network entity such as an access router (not shown). Optionally, the procedures 300, 400, of FIGS. 3 and 4 may be performed so that the AP may request the MIH capabilities of the WTRU 205, and the WTRU 205 may generate and send an MIH capabilities response message to the AP 210 with information relating to the MIH capabilities of the WTRU 205.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The FIRST MIHF may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for use in a wireless transmit/receive unit (WTRU), the method comprising:
   sending a capabilities discovery request message via an access point (AP);
   receiving a capabilities discovery response message that is responsive to the capabilities discovery request message, wherein the capabilities discovery response message includes, for each of a plurality of technologies:
   information indicating a type of the technology; and
   information indicating whether make-before-break (MBB) handover is supported for the technology; and
   performing a handover based on the capabilities discovery response message.

2. The method of claim 1, wherein the handover is performed from a first network of a first technology to a second network of a second technology.

3. The method of claim 2, wherein the handover is a MBB handover.

4. The method of claim 1 wherein the performing the handover includes sending a Media Independent Handover (MIH) handover request message.

5. The method of claim 1 wherein the information indicating whether MBB handover is supported for the technology includes a Boolean representation of whether MBB handover is supported for the technology.

6. The method of claim 1 wherein the plurality of technologies includes one or more of: IEEE 802.3 technology; IEEE 802.11 technology; code division multiple access (CDMA) 2000 technology; Universal Mobile Telephone System (UMTS) technology; CDMA2000-HRPD technology; or Global System for Mobile Communications (GSM) technology.

7. The method of claim 1 wherein the capabilities discovery request message is sent to a Media Independent Handover Function (MIHF) and wherein the capabilities discovery response message is received from the MIHF.

8. A wireless transmit/receive unit (WTRU) comprising:
   a transmitter configured to send a capabilities discovery request message via an access point (AP);
   a receiver configured to receive a capabilities discovery response message that is responsive to the capabilities discovery request message, wherein the capabilities discovery response message includes, for each of a plurality of technologies:
   information indicating a type of the technology; and
   information indicating whether make-before-break (MBB) handover is supported for the technology; and
   the transmitter and the receiver further configured to perform a handover based on the capabilities discovery response message.

9. The WTRU of claim 8, wherein the handover is performed from a first network of a first technology to a second network of a second technology.

10. The WTRU of claim 9, wherein the handover is a MBB handover.

11. The WTRU of claim 8 wherein the transmitter is further configured to send a Media Independent Handover (MIH) handover request message to perform the handover.

12. The WTRU of claim 8 wherein the information indicating whether MBB handover is supported for the technology includes a Boolean representation of whether MBB handover is supported for the technology.

13. The WTRU of claim 8 wherein the plurality of technologies includes one or more of: IEEE 802.10 technology; IEEE 802.18 technology; code division multiple access (CDMA) 2000 technology; Universal Mobile Telephone System (UMTS) technology; CDMA2000-HRPD technology; or Global System for Mobile Communications (GSM) technology.

14. The WTRU of claim 8 wherein the capabilities discovery request message is sent to a Media Independent Handover Function (MIHF) and wherein the capabilities discovery response message is received from the MIHF.

* * * * *

UNITED STATES PATENT AND TRADEMARK OFFICE
CERTIFICATE OF CORRECTION

| | | |
|---|---|---|
| PATENT NO. | : 8,077,672 B2 | Page 1 of 1 |
| APPLICATION NO. | : 12/027892 | |
| DATED | : December 13, 2011 | |
| INVENTOR(S) | : Olvera-Hernandez et al. | |

It is certified that error appears in the above-identified patent and that said Letters Patent is hereby corrected as shown below:

ON THE TITLE PAGE

At Section (57), ABSTRACT, page 1, right column, after line 5 "Then the first MIHF", delete "then".

IN THE SPECIFICATION

At column 1, line 55, after "Then the first MIHF", delete "then".

Figure 1:
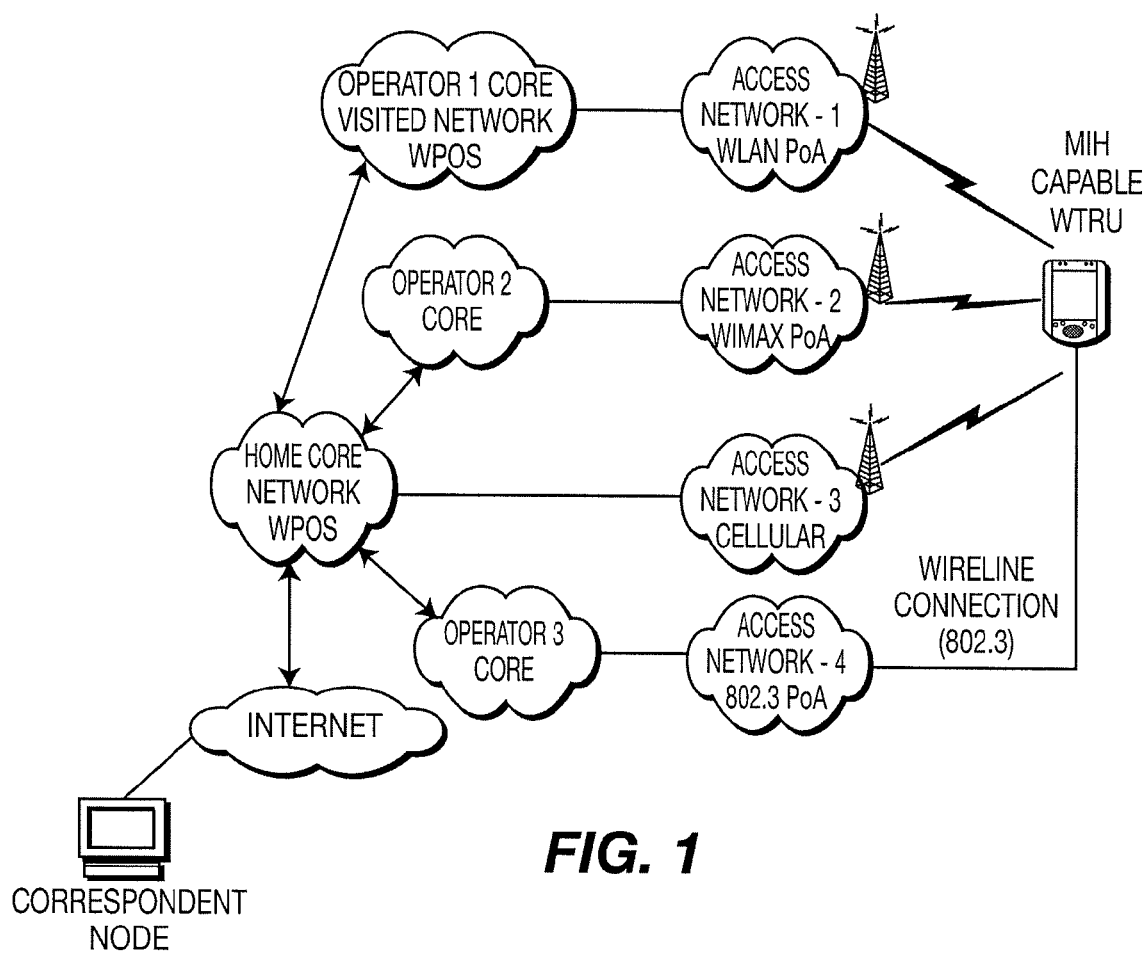
FIG. 1 an example of a wireless communication system configured to support intersystem handover.

At column 2, line 3, after "FIG. 1" insert --is--.

At column 2, line 28, after "an AP", delete "1210" and insert --210--.

At column 2, line 52, after "located in", delete "an".

At column 3, line 4, after "default, therefore", delete "there".

At column 4, line 1, after "could be located in", delete "an".

Signed and Sealed this
Tenth Day of July, 2012

David J. Kappos
*Director of the United States Patent and Trademark Office*